United States Patent [19]

Delotto et al.

[11] Patent Number: 4,646,963
[45] Date of Patent: Mar. 3, 1987

[54] SENSING GROUP IN AN AUTOMATIC CONTROL TEMPERATURE SYSTEM FOR FOODS IN VESSELS HEATED BY A FLAME FROM A GAS BURNER

[75] Inventors: Romeo Delotto, Vinovo; Vanis Orlandin, Pinerolo, both of Italy

[73] Assignee: Indesit Industria Elettrodomestici Italiana S.p.A., Turin, Italy

[21] Appl. No.: 692,033

[22] Filed: Jan. 16, 1985

[30] Foreign Application Priority Data

Jan. 16, 1984 [IT] Italy .............................. 67034 A/84

[51] Int. Cl.⁴ ........................................... G05D 23/02
[52] U.S. Cl. ................................ 236/20 A; 126/39 G
[58] Field of Search .................... 126/39 G; 236/20 A, 236/15 BB

[56] References Cited

U.S. PATENT DOCUMENTS 2,934,957 5/1960 Reinhart et al. .................. 236/20 A
3,051,813 8/1962 Busch et al. ...................... 236/20 A
3,632,040 1/1972 Gouville .......................... 236/20 A

FOREIGN PATENT DOCUMENTS 56621 4/1984 Japan ................................. 126/39 G
2127215 4/1984 United Kingdom ............. 126/39 G Primary Examiner—Larry I. Schwartz
Attorney, Agent, or Firm—Gifford, Groh, VanOphem, Sheridan, Sprinkle and Dolgorukov

[57] ABSTRACT

A sensor group in an automatic temperature control system for foods in vessels heated by a flame from a gas burner supplies a first heat quantity to a temperature sensing element within the group, as a function of the foods' temperature; and a second, smaller heat quantity, as a function of the flame temperature. The ratio between the two heat quantities is such that a small progressive temperature increase is obtained at the sensing element when a constant food temperature has been reached.

15 Claims, 3 Drawing Figures

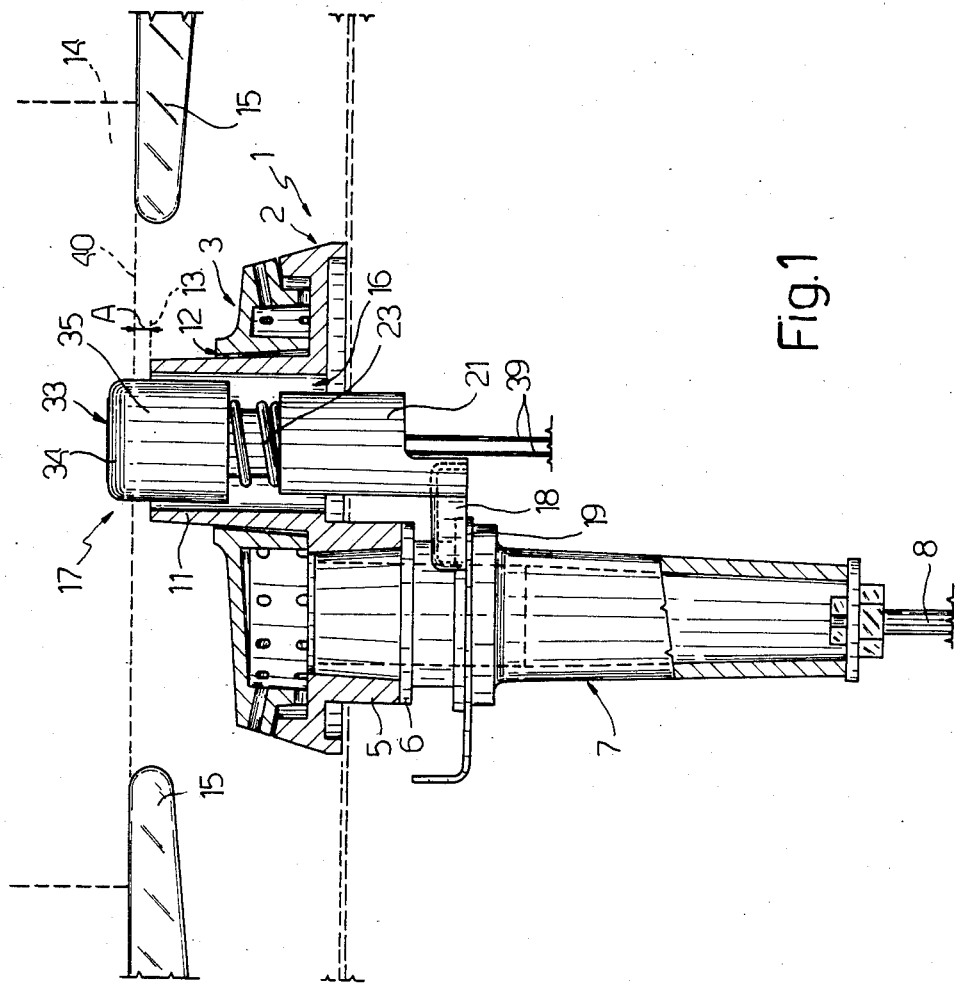

SENSING GROUP IN AN AUTOMATIC CONTROL TEMPERATURE SYSTEM FOR FOODS IN VESSELS HEATED BY A FLAME FROM A GAS BURNER

BACKGROUND OF THE INVENTION

The present invention relates to a sensing group in an automatic temperature control system for foods in vessels heated by a flame from a gas burner, of the type where the sensing group is biased so as to contact the vessel's bottom, in order to directly measure the temperature reached by the foods inside.

In such systems the sensing element controls the gas quantity supplied to the burner, as a function of the temperature chosen by the user. However, malfunctions in such systems may happen if, due to a wrong temperature setting by the user, or due to normal component tolerance variance, the sensing element causes a food temperature higher than the maximum allowable temperature for the vessel.

For instance, if the vessel is filled with water and the temperature set by the user is 105 degrees C., the sensing element will not sense a temperature higher than 100 degrees C. (until the water has boiled away), so that the maximum gas supply will be maintained until all water is evaporated.

SUMMARY OF THE PRESENT INVENTION

It is an object of the present invention to provide a sensing group for an automatic temperature control system which avoids these and other drawbacks and allows the automatic temperature control system to correctly operate without damage to the vessel or to the foods inside it.

Other objects and advantages of the present invention shall be clear from the following description.

According to the present invention a sensing group is provided in an automatic temperature control system for foods in vessels heated by a flame from a gas burner, characterized in that there are provided means to supply to a sensing element within the group a first heat quantity as a function of the temperature of the food, and a second, relatively smaller, heat quantity as a function of the flame temperature; the ratio between the said quantities being such that a small temperature increase is experienced by a sensing element when a constant temperature of the foods has been reached.

According to the present invention a sensing group is provided in an automatic temperature control system for foods in vessels heated by a flame from a gas burner, characterized in that the burner includes a vertical nozzle and that the nozzle axis and sensing group axis are both off center with respect to the burner axis.

BRIEF DESCRIPTION OF THE DRAWINGS

In view of a better understanding of the present invention a particular embodiment is now described, as a nonlimiting example, with reference to the attached drawings, in which:

FIG. 1 is a partial cross-sectional view of a sensing group according to the present invention and assembled on a gas burner;

DETAILED DESCRIPTION OF THE PREFERRED EMBODIMENT OF THE PRESENT INVENTION

Figure 2:
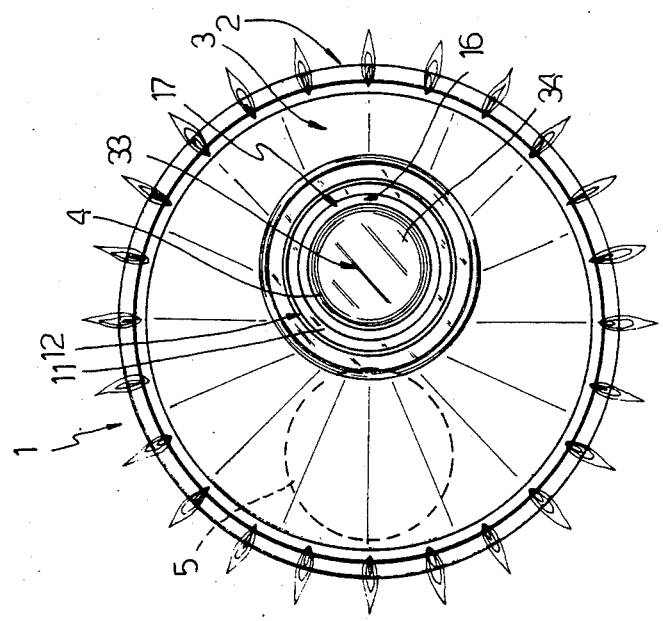
FIG. 2 is a top view of the gas burner according to the present invention and having a sensing group as shown in FIG. 1.

Referring now to FIG. 1, the number 1 indicates a gas burner, comprising a lower part 2 bearing a flame divider 3, both advantageously made out of cast iron or another suitable material. The lower part 2 has a circular shape and includes at its bottom an off center gas inlet duct 5 (FIG. 2), which at the bottom lies on an annular top edge 6 of a vertical nozzle 7, of a known type, having a cross-section increasing towards the top, and in whose lower area there is the end of a gas inlet pipe 8.

An off-center one-piece cylindrical shield 11 protrudes out of the lower part 2 towards the top, passing through a hole 12 in the flame divider 3, and ending at a height 13 lower than a determined value A (a few millimeters, for instance) with respect to the bottom of a vessel 14 (shown with dotted lines in FIG. 1) which lies on grills 15 located around the burner 1.

A temperature sensing group 17 is located inside the cylindrical shield 11 and held by a lower sensor group part 18 on a portion 19 of the vertical nozzle 7. The shield 11 is spaced from the sensor group 17 so as to provide an annular gap 16 around the sensor group 17.

Figure 3:
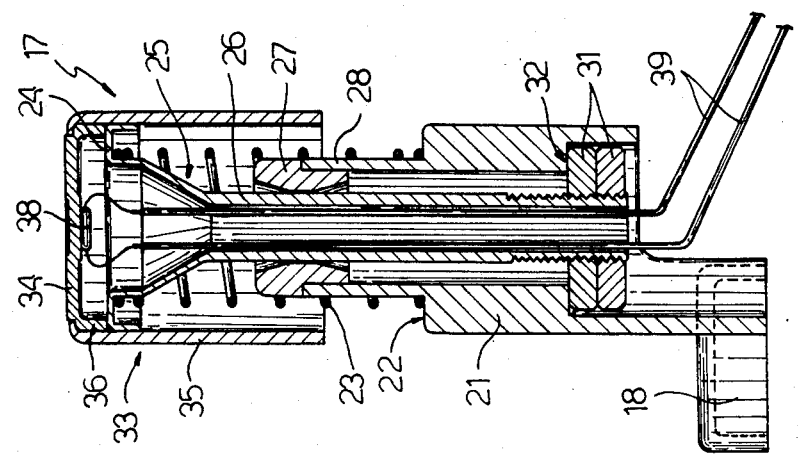
FIG. 3 is another partial cross-sectional view of a sensing group as shown in FIG. 1.

As is better shown in FIG. 3, the sensing group 17 has a lower metallic part 21, comprising a pair of nearly cylindrical shapes with different diameters. The lower sensor group part 18 protrudes out of the bottom of lower metallic part 21, while at the top of lower metallic part 21 there is a step 22 on which one end of a cylindrical spring 23 rests. The other end of the spring 23 bears an annular washer 24 thereon, affixed to a hollow body 25 which is made of a suitable metallic material. The bottom of the body 25 includes a hollow cylindrical stem 26 passing through a guiding collar 27 located on the top edge of an upper reduced diameter part of lower metallic part 21, advantageously made of an antifriction material. The bottom end of stem 26 is externally threaded and on it two nuts 31 are locked, creating a stop against which the annular internal shoulder of lower metallic part 21 can push, to limit movement toward the top of the body 25 due to spring 23.

The annular washer 24 bears on its top a cylindrical cap 33 made in two parts, i.e. with an upper planar part 34 made out of a relatively high thermally conductive material, for instance copper, and a second annular part 35, hooked on a top edge of upper part 34, made out of a second lower thermally conductive material, for instance stainless steel. In particular, upper part 34 includes a perimetral edge 36 bent downward, which abuts the annular washer 24 of body 25. On the lower face of upper part 34 of cap 33 a temperature sensing element 38 is held. The element 38 advantageously comprises a negative temperature coefficient thermistor and has two electric wires 39 connected, in a known manner, to the automatic temperature control system in order to control the amount of gas supplied to burner 1 through pipe 8. The inside of cylindrical cap 33 can be filled with insulating resins.

The operation of the described sensing group according to the present invention is as follows.

When the vessel 14 which contains the foods to be heated is located on the grills 15, the cylindrical cap 33 of sensing group 17 is pushed downwards, against the force of spring 23, and its upper part 34 touches the bottom of vessel 14, at level 40 (FIG. 1).

When the burner 1 is ignited, the foods in vessel 14 are progressively heated and their temperature is sensed by the sensing element 38, due to the good thermal conductivity of the upper part 34 of cap 33. The ascending airstream in gap 16, entering from the lower area of the cylindrical shield 11 and exiting through the circular opening (of height A) between the upper edge of shield 11 and the bottom of vessel 14, generally thermally insulates the cylindrical cap 33 from the burner flame, so that the thermal effect due to the flame of burner 1 is strongly limited.

The circular opening of height A functions to allow a correct operation of the automatic temperature control system even when the user sets the temperature wrongly, or when a variance in component tolerance is experienced. Assuming that for one reason or another the temperature threshold is set at 105 degrees C., and assuming that in vessel 14 there is contained some water (which cannot go beyond 100 degrees C.), as soon as the 100 degrees C. temperature is reached and the water is boiling, the temperature sensed by sensing element 38 through upper part 34 remains constant. However, the effect of the heat quantity supplied by flame of burner 1, which through the circular opening of height A reaches the annular part 35 of cap 33, is effective to affect (albeit with reduced intensity, since the thermal conductivity coefficient of part 35 is small) sensing element 38. The temperature of sensing element 38 therefore slightly but continuously increases, until the 105 degrees C. temperature is reached. As a consequence, the gas supply to the burner is reduced, and the above drawbacks from the lack of intervention by the sensing element 38 are avoided. The described arrangement of sensing group 17 and inlet duct 5 both being off-center with respect to the burner 1 is particulary convenient; the sensing group 17 is close enough to the center 4 of the burner 1 to allow a more correct and uniform temperature measurement, without adversely affecting the operation of the burner 1 due to the off-center position of nozzle 7. The cylindrical shield 11 arrangement around sensing group 17 is also economic, the shield being formed as one piece with the lower part 2 of burner 1.

The manufacturing of different kinds of burners is also very easy, with or without automatic temperature control, because only the lower part 2 and the flame divider 3 of burner 1 need to be different, the nozzle being unchanged.

The advantages achieved by the sensing group 17 according to the present invention are clear from the foregoing description.

Also clear is the fact that modifications and variations may be made to the described embodiment without departing from the scope of the present invention. For instance, the height of the opening above the shield 11 can be different, or the cylindrical cap 33 can be differently made, so long as an arrangement is obtained which allows a first heat quantity to arrive at sensing element 38, as a function of the food temperature in vessel 14, and a second heat quantity, relatively smaller, as a function of the temperature of the flame of burner 1. The second heat quantity is of an amount negligible until a constant food temperature is reached but enough to produce a slight but continous temperature increase thereafter, assuring the actuation of the sensing element.

The sensing group 17 can also be applied to gas burners having an inclined nozzle, or of the crown type, and can therefore be axially located.

We claim:
1. An apparatus for automatically controlling the temperature of foods in a vessel heated by a flame of a gas burner, comprising:
 a cap comprising an upper part having a first thermal conductivity, and an annular part in thermal contact with said upper part and having a second thermal conductivity lower than said first thermal conductivity, said annular part being exposed to but spaced from said flame;
 means for biasing said cap against said vessel so that said upper cap part abuts said vessel; and
 means for controlling the quantity of gas supplied to said burner, said control means comprising a temperature responsive sensor borne on said upper cap part.

2. The invention according to claim 1, wherein said upper cap part is composed of copper, and said annular cap part is composed of steel.

3. The invention according to claim 1, wherein said control means comprises a thermistor touching an internal surface of said upper cap part.

4. The invention according to claim 1, further comprising a shield disposed about and extending at least part way along said cap and having an upper shield end spaced below an upper end of said cap, such that a portion of said annular cap part above said shield is exposed to said flame.

5. The invention according to claim 4, wherein said upper shield end is spaced from said vessel.

6. The invention according to claim 5, wherein the distance from said vessel to said upper shield end is of the order of a few millimeters.

7. The invention according to claim 4, wherein said shield extends substantially to the height of said cap, and wherein said apparatus further comprises means forming an air gap between said cap and said shield.

8. The invention according to claim 4, wherein said apparatus further comprises a lower bearing part formed as a single piece with said shield and which carries said burner thereon.

9. The invention according to claim 8, wherein said burner further comprises a flame divider body disposed on said lower bearing part, said divider body including an opening in which said shield is disposed.

10. The invention according to claim 1, wherein said burner has a first axis, and comprises a vertical nozzle having a second axis; and wherein said cap has a third axis, said second nozzle axis and said third cap axis both being offset from said first burner axis.

11. An apparatus for automatically controlling the temperature of foods in a heated vessel, comprising:
 a gas burner having a first axis;
 a gas nozzle connected to said burner and having a second axis offset from said first burner axis; and
 a sensor group adjacent to said burner and said nozzle controlling the quantity of gas supplied to said burner, and having a third axis offset from said first burner axis;
 wherein said sensor group comprises a sensing element in thermal contact with said foods and means to provide a quantity of heat to said element as a function of the temperature of a flame produced by said burner, said quantity of heat being smaller than that supplied to said sensor element from said foods, such that the temperature indicated by said element increases after said foods reach a constant temperature.

12. The invention according to claim 11, wherein said burner defines a burner perimeter, and wherein said sensor group is positioned interiorly of said burner perimeter.

13. An apparatus for automatically controlling the temperature of foods in a heated vessel, comprising:

a gas burner having a first axis;

a gas nozzle connected to said burner and having a second axis offset from said first burner axis; and a sensor group adjacent to said burner and said nozzle controlling the quantity of gas supplied to said burner, and having a third axis offset from said first burner axis.

14. The invention according to claim 13, wherein said burner defines a burner perimeter, and wherein said sensor group is positioned interiorly of said burner perimeter.

15. The invention according to claim 11, wherein said apparatus comprises: a lower bearing part on which said burner is positioned; and a shield formed as a single piece with said bearing part, at least partly disposed between said burner and said sensor group.

* * * * *